United States Patent

Takeda et al.

[11] Patent Number: 5,922,122
[45] Date of Patent: Jul. 13, 1999

[54] PIGMENT-DISPERSED COMPOSITION

[75] Inventors: Akihiko Takeda; Takekatsu Sugiyama, both of Shizuoka, Japan

[73] Assignee: Fuji Photo Film Co., Ltd., Kanagawa, Japan

[21] Appl. No.: 08/902,628

[22] Filed: Jul. 29, 1997

[30] Foreign Application Priority Data

Jul. 31, 1996 [JP] Japan ................................. 8-217761

[51] Int. Cl.$^6$ .................................................. C09D 67/00
[52] U.S. Cl. ..................... 106/493; 106/413; 106/496; 106/497; 106/498; 544/180; 544/194; 544/197; 544/198; 544/204; 544/208; 544/209; 544/211; 544/212
[58] Field of Search ...................... 106/413, 493, 106/496, 497, 498; 544/180, 194, 196, 197, 198, 204, 208, 209, 211, 212

[56] References Cited

U.S. PATENT DOCUMENTS

Re. 33,853   3/1992   Okoshi et al. ........................ 106/413
5,801,244    9/1998   Raspanti ............................... 544/197

*Primary Examiner*—Mark L. Bell
*Assistant Examiner*—Scott L. Hertzog
*Attorney, Agent, or Firm*—Sixbey, Friedman, Leedom & Ferguson, P.C.; Gerald J. Ferguson, Jr.

[57] ABSTRACT

A composition containing an organic pigment and a compound having the formula (I):

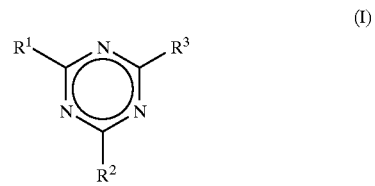

in which $R^1$ is a group having the formula (II):

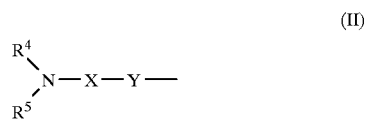

in which $R^4$ and $R^5$ represent hydrogen or alkyl, or $R^4$ and $R^5$ are bonded to each other to form a ring together with a nitrogen atom, X represents alkylene or alkyleneoxyalkylene, and Y represents —O—, —S— or a group represented by —NR$^6$— wherein $R^6$ is hydrogen or lower alkyl; and $R^2$ and $R^3$ represent a group having the formula (II), alkyl, aralkyl, aryl, alkoxy, aralkyloxy, aryloxy, alkylamino, arylamino or a halogen atom. A photosensitive colored composition is made of the composition, a polymer having acidic group, a photopolymerizable monomer and a photopolymerization initiator.

16 Claims, No Drawings

PIGMENT-DISPERSED COMPOSITION

FIELD OF THE INVENTION

The present invention relates to a pigment-dispersed composition having excellent dispersibility and flowability and high coloring power, and to a photosensitive colored resin composition containing the pigment-dispersed composition. Particularly, the pigment-dispersed composition of the invention is favorably employable for the preparation of a paint, a printing ink and a color display panel, and the photosensitive colored resin composition of the invention is favorably employable for the preparation of a multi-color image on a support (e.g., a color proof) and of a color filter employed in the preparation of a color liquid crystal display device.

BACKGROUND OF THE INVENTION

Pigments having distinct hue and high coloring power are practically important, and are in the form of fine particles whose particle size is greatly reduced. Reduction of the particle size brings about the high coloring power. However, dispersion of the pigments having the reduced particle size is apt to show a high viscosity. In the case that the dispersion having high viscosity is prepared in an industrial scale, problems of difficultly taking off it from a dispersing machine and scarcely transporting it through a pipe line occur. Further, the dispersion occasionally comes unemployable due to gelation produced during its storage.

A photosensitive colored resin composition containing the above pigments of reduced particle size is useful as image forming material for preparing a color proof or a color filter which needs distinct hue and high coloring power.

A colored image is, for example, prepared using the photosensitive colored resin composition by the steps of: forming a layer of the photosensitive colored resin composition on a support, imagewise exposing the layer to light and developing the exposed layer. In the developing procedure, an aqueous alkaline solution is generally employed rather than an organic solvent as a developing solution in view of environmental pollution, and therefore the photosensitive colored resin layer is preferably soluble in an aqueous alkaline solution.

Further, the photosensitive colored resin composition is usually employed by dissolving it in an organic solvent to prepare a coating solution so as to reduce a time period for drying the coated layer. Thus, a binder (polymer) employable for the photosensitive colored resin composition is required to have an acidic group and be soluble in an appropriate organic solvent. The photosensitive colored resin composition is usually composed of an organic solvent, the polymer having acidic group and the pigment (especially organic pigment) dispersed therein.

The photosensitive colored resin layer (layer of photosensitive colored resin composition) is usually so formed as to have an extremely reduced thickness, which is required to show a high color strength. Therefore, it is necessary that the organic pigment is dispersed in the polymer having acidic group and the organic solvent under condition that the particle size of organic pigment is sufficiently reduced.

The photosensitive colored resin composition (containing organic pigment having highly reduced particle size) is, for example, useful for preparing a color proof or a color filter.

The color filter is usually prepared by forming red, green and blue pixels on a transparent support. The pixels are formed by various known methods such as a dyeing method, a printing method, an electro-deposition method and a pigment dispersion method. The pigment dispersion method is preferred from the viewpoints of quality of the resultant color filter and production efficiency.

The preparation of color filter according to the pigment dispersion method, is generally performed by the steps of: coating a solution of the photosensitive colored resin composition on a transparent support to form a photosensitive colored resin layer, imagewise exposing the photosensitive colored resin layer to light and developing the layer to form a pixel of a first color (e.g., red); and repeating these procedures two or more times to form pixels having colors different from the first color, whereby a pixel pattern having two or more colors is obtained.

When the particle size of the pigment employed for the photosensitive colored resin composition is not satisfactorily reduced, the transmittance of the resultant color filter lowers due to light adsorption and light scattering of the pigment. A liquid crystal display device where the color filter is arranged occasionally shows lowering of display contrast because a polarizing axis of the device is shifted due to the light adsorption and scattering (The 7th Color Optical Conference, Color Filter for 512 Color Displayed 10.4 inch TFT-LCD, Ueki, Ozeki, Fukunaga and Yamanaka, 1990). Hence, it is required to greatly reduce the particle size of the pigment.

To obtain the pigment dispersion having excellent flowability and a greatly reduced particle size, it is known to use various dispersants. The dispersants are classified into polymer dispersants and low molecular weight dispersants.

Examples of the polymer type dispersants include salt of polyacrylic acid, sodium maleate/olefin copolymer, polyester having a carboxy group at terminal (Japanese Patent Publication No. 2(1990)-34009) and polyester having acidic and basic groups obtained by using tetrakis(2-hydroxyalkyl) ethylenediamine as a starting material (Japanese Patent Provisional Publication No. 2(1990)-24523). Examples of the low molecular weight type dispersants include sorbitan fatty acid esters, polyoxyethylene alkylamine and alkyldiamine and alkanolamine derivatives (U.S. Pat. No. 3,536,510).

In the preparation of photosensitive colored resin composition comprising an organic pigment dispersed in the polymer having acidic group which is useful for preparing a color proof or color filter, it is not known as to which kind of dispersant to be used though a fluorine containing surface active agent is usually employed as an additive.

SUMMARY OF THE INVENTION

An object of the present invention is to provide a pigment-dispersed composition having excellent dispersibility and flowability and capable of giving an image having high coloring power and high transmittance.

Another object of the invention is to provide a photosensitive colored resin composition containing the pigment-dispersed composition which is capable of developing in an alkaline developing solution and of giving an image having high coloring power.

The inventors have studied to obtain a dispersant to give a dispersion of pigment having highly reduced particle size which shows an excellent flowability. As a result, it has been revealed that when an organic pigment is dispersed in the polymer having acidic group which is soluble in an organic solvent, intermolecular forces are generated between the acidic group and the pigment to increase viscosity of the dispersion. Further, it has been clarified that the increase of viscosity of the dispersion brings about good dispersing stability of pigment but inhibits reduction of particle size of pigment. Thus, the above study has clarified that a dispersant promoting reduction of particle size without increase of viscosity is required.

Further study by the inventors has revealed the following. As dispersants promoting reduction of particle size without increase of viscosity, the low molecular weight compounds are preferred rather than the polymer type, and further amine compounds of known low molecular weight compounds give relatively high reduction of particle size. However, the amine compounds is apt to form a salt together with the acidic group, which results in unfavorable behavior in thereafter developing procedure (e.g., the photosensitive colored resin layer comes highly soluble in the developing solution). Also, dispersants having alkaline property or those highly soluble in water show the same tendency as in the amine compounds.

The inventors have further studied on various compounds to obtain a dispersant promoting reduction of particle size without increase of viscosity based on the above findings, to find the triazine compounds of the invention. Of the triazine compounds, triazine compounds having a coumarinyl (7) group are known as a fluorescent whitener described in Japanese Patent Publication No. 48(1973)-37969 and Japanese Patent Provisional Publication No. 49(1974)-17423, and however the Publications have no description of using them for dispersant.

There is provided by the present invention 1. A composition containing an organic pigment and a compound having the formula (I) in an amount of 0.1 to 200 weight % of the pigment:

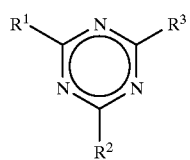

(I)

in which $R^1$ is a group having the formula (II):

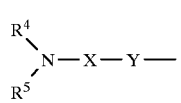

(II)

in which each of $R^4$ and $R^5$ independently represents a hydrogen atom, an alkyl group, a hydroxyalkyl group or an alkoxyalkyl group, or $R^4$ and $R^5$ are bonded to each other to form a ring together with a nitrogen atom, X represents an alkylene group or an alkyleneoxyalkylene group, and Y represents —O— —S— or a group represented by —NR$^6$— wherein $R^6$ is a hydrogen atom or a lower alkyl group; and each of $R^2$ and $R^3$ independently represents a group having the formula (II), an alkyl group, an aralkyl group, an aryl group, an aryl group substituted with alkyl, an alkoxy group, an alkoxy group substituted with alkoxy or aryloxy, an aralkyloxy group, an aryloxy group, an alkylamino group, an alkylamino group substituted with aryl, an arylamino group, an arylamino group substituted with alkyl or aryl, an amino group substituted with heterocyclic group, an amino group substituted with heterocyclic group having alkyl or aryl, or a halogen atom.

Preferred embodiments of the process of the invention are as follows:

1) The composition wherein each of $R^4$ and $R^5$ independently represents a hydrogen atom, a lower alkyl group, a hydroxyalkyl group or an alkoxyalkyl group, or $R^4$ and $R^5$ are bonded to each other to form a ring together with a nitrogen atom, X represents an alkylene group of 2 to 5 carbon atoms or an alkyleneoxyalkylene group of 2 to 5 carbon atoms, and Y represents —O— or NR$^6$.

2) The composition wherein each of $R^4$ and $R^5$ independently represents a hydrogen atom, an alkyl group of 1 to 5 carbon atoms, a hydroxyalkyl group of 1 to 5 carbon atoms or an alkoxyalkyl group of 2 to 5 carbon atoms, or $R^4$ and $R^5$ are bonded to each other to form a ring together with a nitrogen atom, X represents an alkylene group of 2 to 5 carbon atoms or an alkyleneoxyalkylene group of 2 to 5 carbon atoms, and Y represents —O— or NR$^6$.

3) The pigment-dispersed composition wherein $R^2$ and $R^3$ represent each independently a lower alkoxy group (of 1 to 5 carbon atoms), an alkoxy group of 2 to 6 carbon atoms substituted with alkyl, a lower alkylamino group (of 1 to 5 carbon atoms), an alkylamino group of 7 to 11 carbon atoms substituted with aryl, an aralkyloxy group of 6 to 30 carbon atoms, an aralkyloxy group of 6 to 30 carbon atoms having a substituent, an aryloxy group of 6 to 30 carbon atoms, an aryloxy group of 6 to 30 carbon atoms, an arylamino group of 6 to 30 carbon atoms, an amino group of 5 to 30 carbon atoms substituted with heterocyclic group, an amino group of 6 to 30 carbon atoms substituted with heterocyclic group having alkyl or aryl.

4) The composition wherein each of $R^4$ and $R^5$ independently represents a hydrogen atom, an alkyl group of 1 to 4 carbon atoms, an alkyl group of 1 to 4 carbon atoms substituted with hydroxy group or alkoxy at its terminal, or $R^4$ and $R^5$ are bonded to each other to form a morphorin ring together with a nitrogen atom, X represents an alkylene group of 2 to 5 carbon atoms or an alkyleneoxyalkylene group of 2 to 5 carbon atoms, and Y represents —NH—.

5) The composition wherein $R^2$ represents a group having —NHR$^7$ wherein $R^7$ represents an aryl group of 6 to 10 carbon atoms, an aralkyl group of 7 to 8 carbon atoms or an alkyl group of 1 to 4 carbon atoms, a group having the formula (II) with proviso that $R^4$ and $R^5$ represent each independently a lower alkyl group (of 1 to 5 carbon atoms), X represents an alkylene group of 2 to 3 carbon atoms and Y represents —NH—, an alkyl group of 1 to 4 carbon atoms, an aralkyl group of 7 to 9 carbon atoms, an alkoxy group of 1 to 8 carbon atoms, an alkoxy group of 2 to 8 carbon atoms substituted with alkoxy or phenoxy, an aryloxy group of 6 to 10 carbon atoms, an aryl group of 6 to 10 carbon atoms or a halogen atom; and $R^3$ represents a group having —NHR$^8$ wherein $R^8$ represents a coumarinyl group, a coumarinyl group substituted with phenyl or methyl, an aryl group of 6 to 12 carbon atoms, an aryl group of 7 to 12 carbon atoms substituted with alkyl, an aralkyl group of 7 to 11 carbon atoms, a quinolinyl group or an alkyl group of 1 to 4 carbon atoms, or an alkoxy group of 1 to 4 carbon atoms.

6) The composition which further contains a polymer having acidic group.

7) The wherein the organic pigment comprises a yellow organic pigment.

Further, there is provided by the invention a composition containing the above-mentioned composition and an organic solvent.

Furthermore, there is provided by the invention a photosensitive colored resin composition comprising one of the above (pigment-dispersed) compositions, a polymer having acidic group, a photopolymerizable monomer having at least two ethylenically unsaturated double bonds and a photopolymerization initiator.

A layer of the photosensitive colored resin composition can be formed on a support (temporary support) to prepare a photosensitive transfer sheet.

The following triazine compound is novel.

A triazine compound having the formula (III):

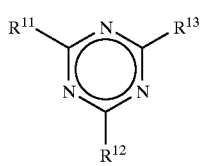

(III)

in which $R^{11}$ represents a group $R^4$ having the formula (IV):

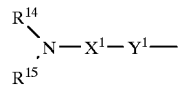

(IV)

wherein each of $R^{14}$ and $R^{15}$ independently represents a hydrogen atom, an alkyl group of 1 to 4 carbon atoms, an alkyl group of 1 to 4 carbon atoms substituted with hydroxy group or alkoxy at its terminal, or $R^{14}$ and $R^{15}$ are bonded to each other to form a morphorin ring together with a nitrogen atom, $X^1$ represents an alkylene group of 2 to 5 carbon atoms or an alkyleneoxyalkylene group of 2 to 5 carbon atoms, and $Y^1$ represents —NH—;

$R^{12}$ represents a group having —NHR$^{17}$ wherein $R^{17}$ represents an aryl group of 6 to 10 carbon atoms, an aralkyl group of 7 to 8 carbon atoms or an alkyl group of 1 to 4 carbon atoms, a group of the formula (IV) with proviso that each of $R^{14}$ and $R^{15}$ independently represents a lower alkyl group (of 1 to 5 carbon atoms), $X^1$ represents an alkylene group of 2 to 3 carbon atoms and $Y^1$ represents —NH—, an alkyl group of 1 to 4 carbon atoms, an aralkyl group of 7 to 9 carbon atoms, an alkoxy group of 1 to 8 carbon atoms, an alkoxy group of 2 to 8 carbon atoms substituted with alkoxy or phenoxy, an aryloxy group of 6 to 10 carbon atoms, an aryl group of 6 to 10 carbon atoms or a halogen atom; and $R^3$ represents a group having —NHR$^{18}$ wherein $R^{18}$ represents an aryl group of 6 to 12 carbon atoms, an aryl group of 7 to 12 carbon atoms substituted with alkyl, an aralkyl group of 7 to 11 carbon atoms, a quinolinyl group or an alkyl group of 1 to 4 carbon atoms, or an alkoxy group of 1 to 4 carbon atoms.

The photosensitive colored resin composition can be advantageously employed in an image forming method comprising the steps of coating a coating solution of the photosensitive colored resin composition in an organic solvent on a support, drying to form a photosensitive colored resin layer, imagewise exposing the layer to light and developing the exposed layer. The photosensitive colored resin composition can be employed for preparing a color proof or color filter through utilizing the image forming method.

The pigment-dispersed composition of the invention has excellent dispersibility and flowability and gives an image having high coloring power due to high reduction of particle size of the pigment. In the case that the layer of the photosensitive colored resin composition of the invention containing the pigment-dispersed composition is imagewise exposed to light and developed using an alkaline developing solution, the layer shows excellent development characteristics to an alkaline developing solution (alkali developing property) and the resultant colored image shows high coloring strength.

DETAILED DESCRIPTION OF THE INVENTION

The pigment-dispersed composition of the invention contains an organic pigment dispersed in a compound having the following formula (I); or contains the pigment dispersed in an organic solvent and the compound. The composition generally contains further a polymer (preferably having an acidic group).

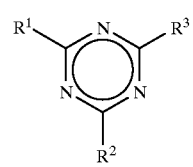

(I)

in which $R^1$ is a group having the formula (II):

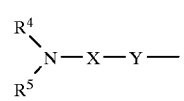

(II)

in which each of $R^4$ and $R^5$ independently represents a hydrogen atom, an alkyl group, a hydroxyalkyl group or an alkoxyalkyl group, or $R^4$ and $R^5$ are bonded to each other to form a ring together with a nitrogen atom, X represents an alkylene group or an alkyleneoxyalkylene group, and Y represents —O— —S— or a group represented by —NR$^6$— wherein $R^6$ is a hydrogen atom or a lower alkyl group; and each of $R^2$ and $R^3$ independently represents a group having the formula (II), an alkyl group, an aralkyl group, an aryl group, an aryl group substituted with alkyl, an alkoxy group, an alkoxy group substituted with alkoxy or aryloxy, an aralkyloxy group, an aryloxy group, an alkylamino group, an alkylamino group substituted with aryl, an arylamino group, an arylamino group substituted with alkyl or aryl, an amino group substituted with heterocyclic group, an amino group substituted with heterocyclic group having alkyl or aryl, or a halogen atom.

In the formula (I), each of $R^4$ and $R^5$ generally represents a hydrogen atom, an alkyl group of 1 to 5 carbon atoms, a hydroxyalkyl group of 1 to 5 carbon atoms or an alkoxyalkyl group of 2 to 5 carbon atoms, or $R^4$ and $R^5$ are bonded to each other to form a ring together with a nitrogen atom (preferably saturated ring containing —O—). Each of $R^4$ and $R^5$ preferably represents a hydrogen atom, an alkyl group of 1 to 4 carbon atoms, an alkyl group of 1 to 4 carbon atoms substituted with hydroxy group or alkoxy at its terminal, or $R^4$ and $R^5$ are bonded to each other to form a morphorin ring together with a nitrogen atom. Especially, $R^4$ and $R^5$ represent each independently an alkyl group of 1 to 4 carbon atoms or $R^4$ and $R^5$ are bonded to each other to form a morphorin ring.

X preferably represents an alkylene group of 2 to 5 carbon atoms or an alkyleneoxyalkylene group of 2 to 5 carbon atoms.

Y preferably represents —O— or NR⁶ and especially represents —NH—.

Each of $R^2$ and $R^3$ generally represents a lower alkoxy group (of 1 to 5 carbon atoms), a lower alkoxy group (of 2 to 5 carbon atoms) substituted with alkyl, a lower alkylamino group (of 1 to 5 carbon atoms), a lower alkylamino group (of 7 to 11 carbon atoms) substituted with aryl, an aralkyloxy group of 6 to 30 carbon atoms, an aralkyloxy group of 6 to 30 carbon atoms, an aryloxy group of 6 to 30 carbon atoms, an amino group of 5 to 30 carbon atoms substituted with heterocyclic group, an amino group of 6 to 30 carbon atoms substituted with heterocyclic group having alkyl or aryl.

$R^2$ preferably represents:

a group having —NHR⁷ wherein $R^7$ represents an aryl group of 6 to 10 carbon atoms (especially phenyl and naphthyl), an aralkyl group of 7 to 8 carbon atoms (especially phenethyl) or an alkyl group of 1 to 4 carbon atoms, a group having the formula (II) with proviso that each of $R^4$ and $R^5$ independently represents a lower alkyl group (1 to 4 carbon atoms), X represents an alkylene group of 2 to 3 carbon atoms and Y represents —NH—, an alkyl group of 1 to 4 carbon atoms, an alarkyl group of 7 to 9 carbon atoms (especially benzyl or phenethyl), an alkoxy group of 1 to 8 carbon atoms, an alkoxy group of 2 to 8 carbon atoms substituted with alkoxy or phenoxy (especially methoxyethoxy or phenoxyethoxy), an aryloxy group of 6 to 10 carbon atoms (especially phenoxy or naphthyloxy), an aryl group of 6 to 10 carbon atoms (especially phenyl) or a halogen atom (especially chlorine).

$R^3$ preferably represents a group having —NHR⁸ wherein $R^8$ represents a coumarinyl group, a coumarinyl group substituted with phenyl or methyl, an aryl group of 6 to 12 carbon atoms (especially phenyl or naphthyl), an aryl group of 6 to 12 carbon atoms substituted with alkyl (especially methyl), an aralkyl group of 7 to 11 carbon atoms (especially benzyl), a quinolinyl group or an alkyl group of 1 to 4 carbon atoms, or an alkoxy group of 1 to 4 carbon atoms. The substituted coumarinyl group generally is 3-or 4-substituted coumarinyl (7) group.

Preferred examples of the triazine compounds of the formula (I) which are employable for the dispersant of the invention are as follows:

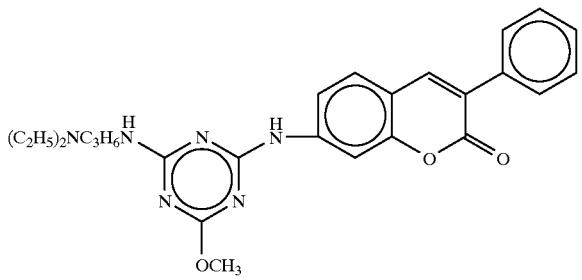

(1)

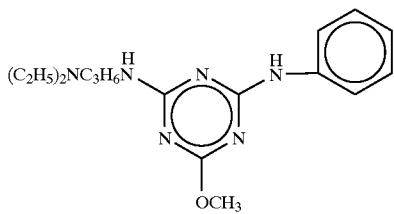

(2)

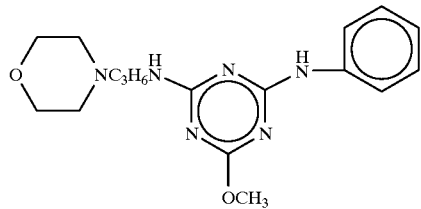

(3)

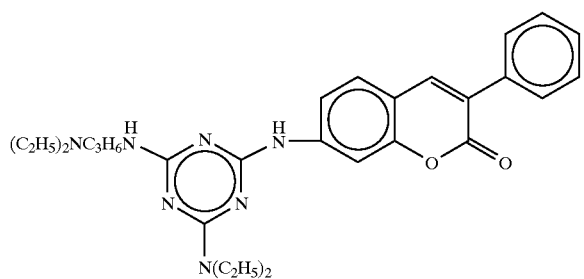
(4)
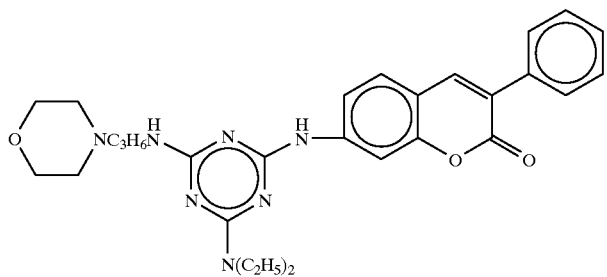
(5)
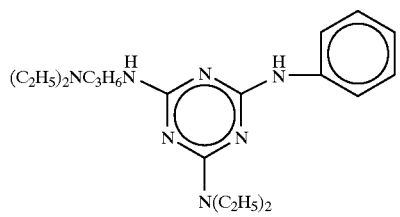
(6)
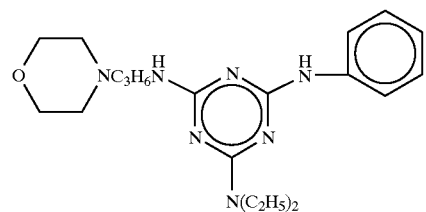
(7)
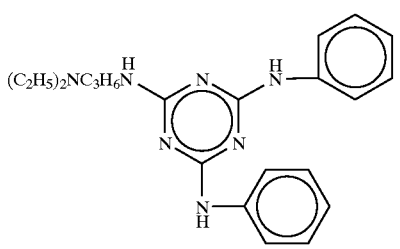
(8)
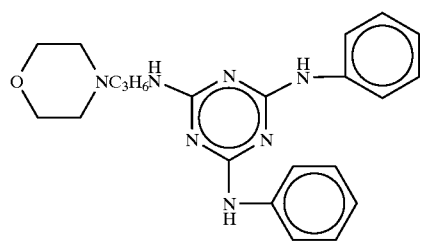
(9)

(10)
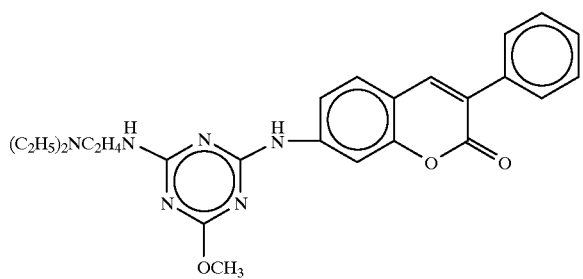
(11)
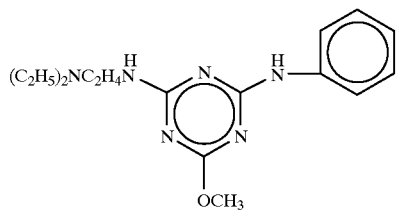
(12)
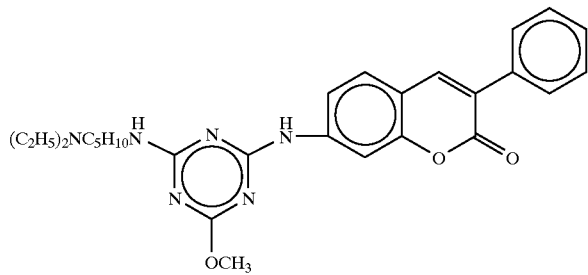
(13)
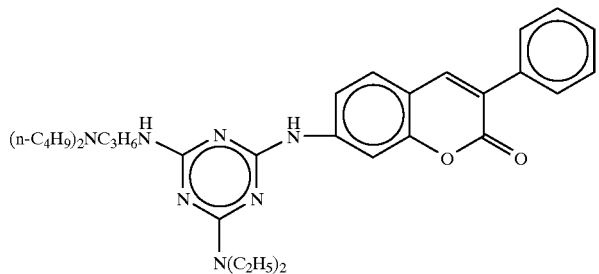
(14)
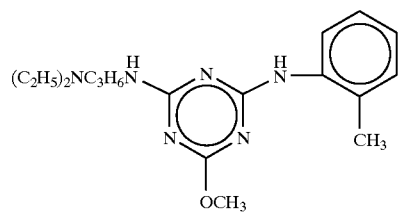

-continued
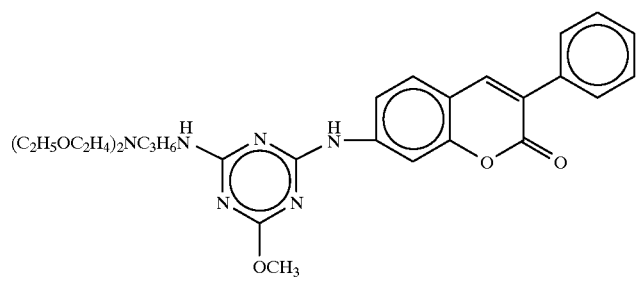
(15)
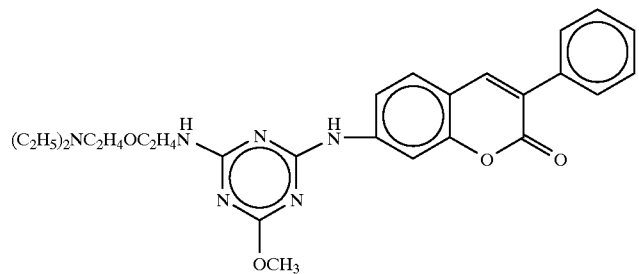
(16)
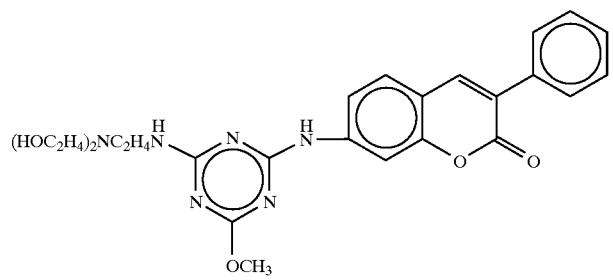
(17)
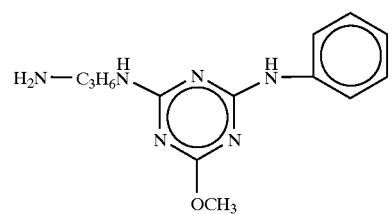
(18)
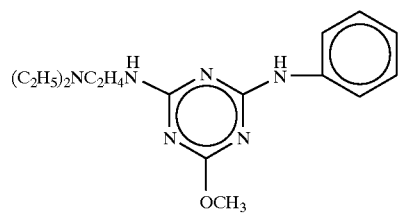
(19)

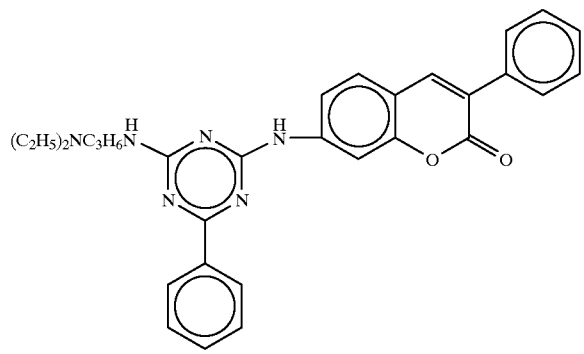
(20)
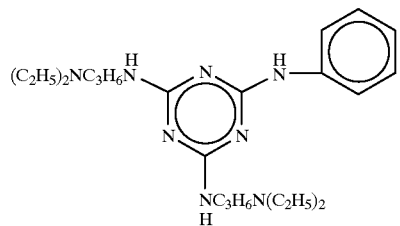
(21)
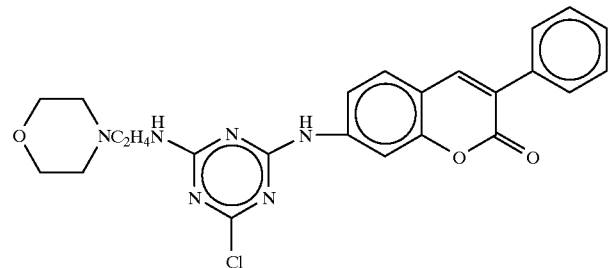
(22)
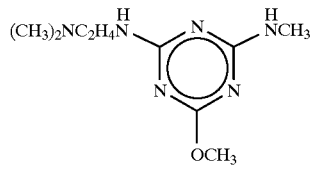
(23)
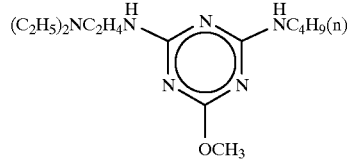
(24)
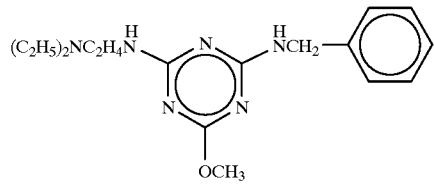
(25)

-continued
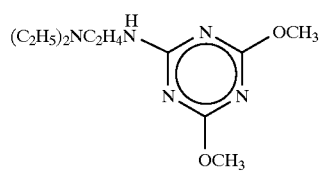
(26)
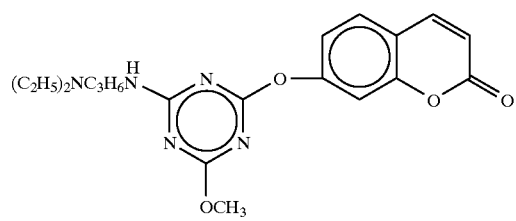
(27)
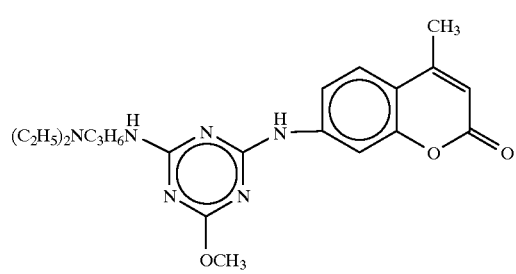
(28)
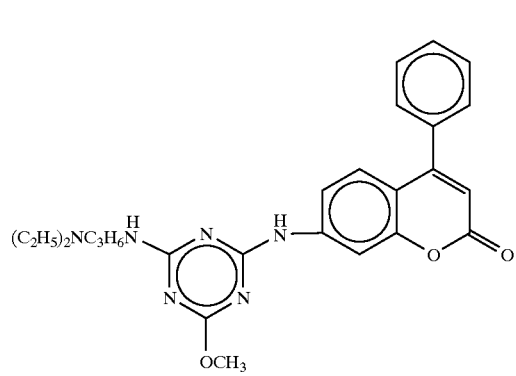
(29)
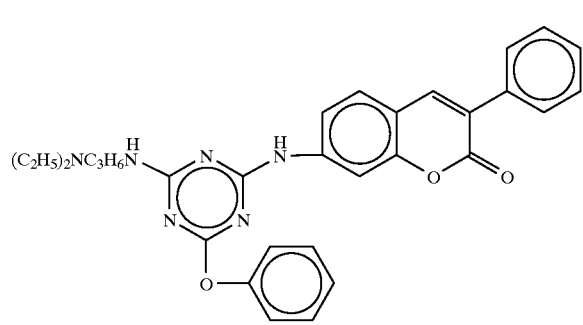
(30)

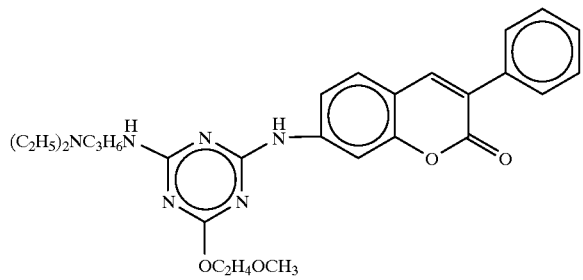
(31)
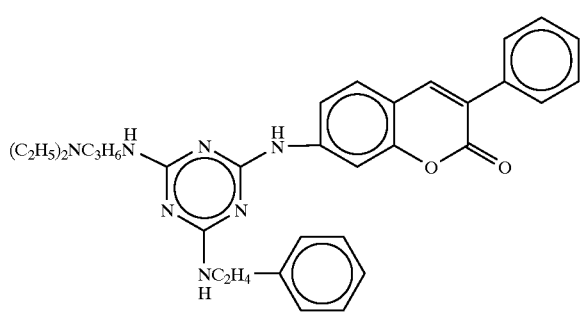
(32)
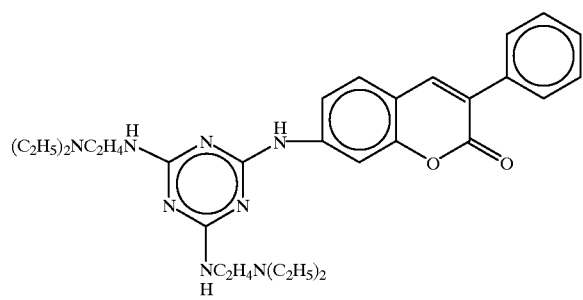
(33)
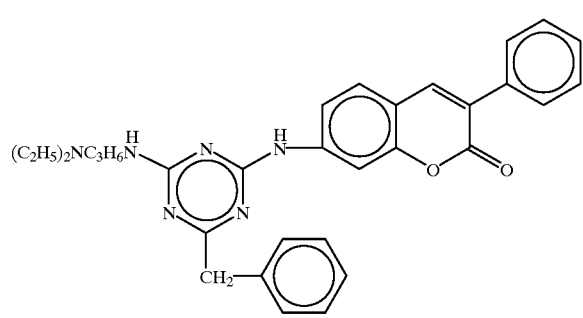
(34)
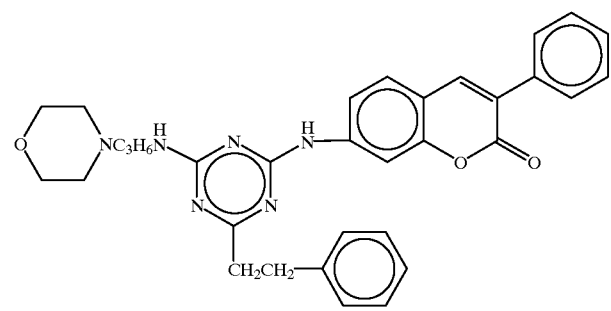
(35)

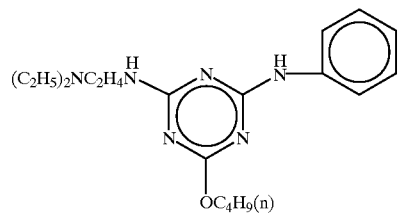 (36)
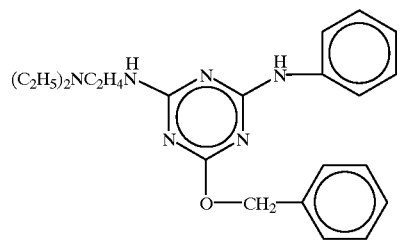 (37)
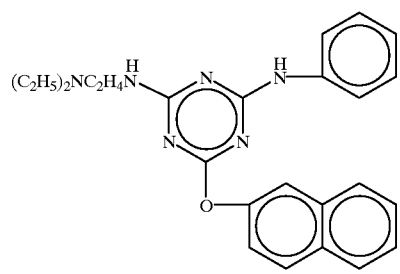 (38)
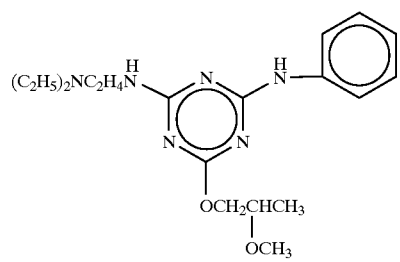 (39)
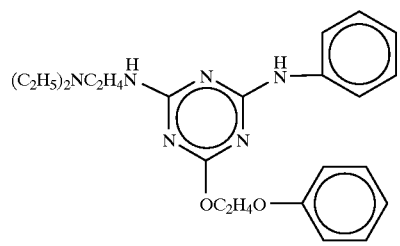 (40)
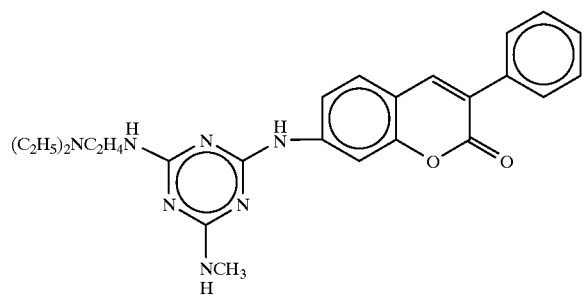 (41)

-continued
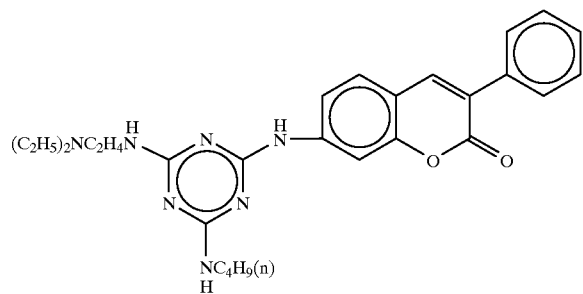
(42)
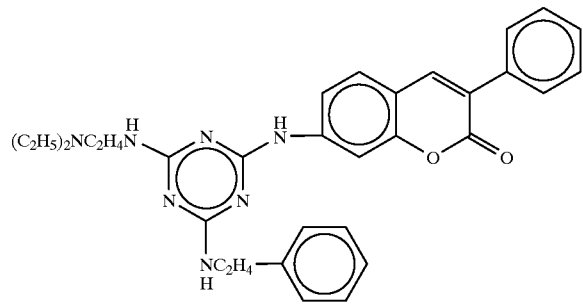
(43)
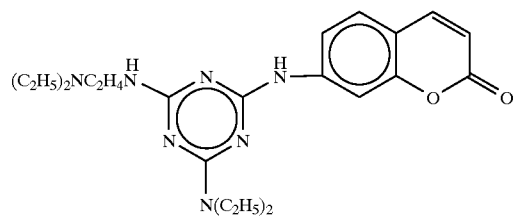
(44)
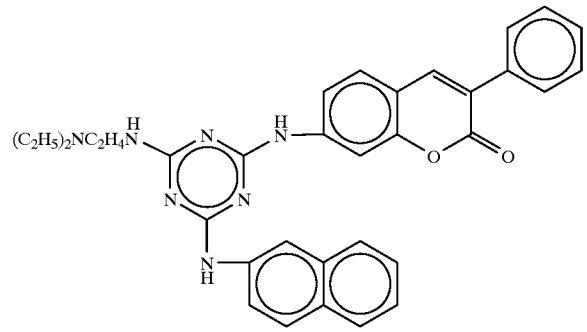
(45)
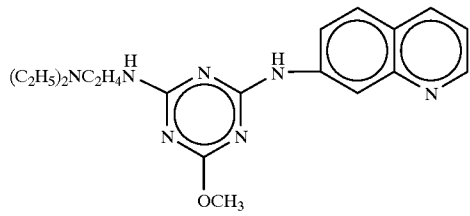
(46)

Of the compounds of the formula (I), the compounds represented by the following formula (III) are novel triazine compounds.

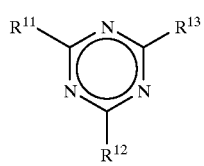

(III)

in which $R^{11}$ represents a group having the formula (IV):

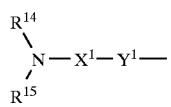

(IV)

wherein $R^{14}$ and $R^{15}$ represent each independently a hydrogen atom, an alkyl group of 1 to 4 carbon atoms, an alkyl group of 1 to 4 carbon atoms substituted with hydroxy group or alkoxy at its terminal, or $R^{14}$ and $R^{15}$ are bonded to each other to form a morphorin ring together with a nitrogen atom, $X^1$ represents an alkylene group of 2 to 5 carbon atoms or an alkyleneoxyalkylene group of 2 to 5 carbon atoms, and $Y^1$ represents —NH—;

$R^{12}$ represents a group having —NHR$^{17}$ wherein $R^{17}$ represents an aryl group of 6 to 10 carbon atoms (preferably phenyl or naphthyl), an aralkyl group of 7 to 8 carbon atoms (preferably phenethyl) or an alkyl group of 1 to 4 carbon atoms, a group of the formula (IV) with proviso that $R^{14}$ and $R^{15}$ represent each independently a lower alkyl group (of 1 to 5 carbon atoms; preferably ethyl), $X^1$ represents an alkylene group of 2 to 3 carbon atoms and $Y^1$ represents —NH—, an alkyl group of 1 to 4 carbon atoms, an alarkyl group of 7 to 9 carbon atoms (preferably benzyl or phenethyl), an alkoxy group of 1 to 6 carbon atoms, an alkoxy group of 2 to 8 carbon atoms substituted with alkoxy or phenoxy, an aryloxy group of 6 to 10 carbon atoms (preferably phenoxy or naphthyloxy), an aryl group of 6 to 10 carbon atoms (preferably phenyl) or a halogen atom (preferably chlorine); and $R^{13}$ represents a group having —NHR$^{18}$ wherein $R^{18}$ represents an aryl group of 6 to 12 carbon atoms (preferably phenyl or naphthyl), an aryl group of 7 to 12 carbon atoms substituted with alkyl (alkyl preferably is methyl), an aralkyl group of 7 to 11 carbon atoms (preferably benzyl), a quinolinyl group or an alkyl group of 1 to 4 carbon atoms, or an alkoxy group of 1 to 4 carbon atoms (preferably methoxy).

The dispersant of the formula (I) can be employed in combination with a known dispersant. A weight ratio of the dispersant of the formula (I) and the known dispersant preferably is in the range of 99:1 to 10:90, especially in the range of 99:1 to 30:70. Examples of the known dispersants include amide compounds such as nonanoamide, decaneamide, dodecaneamide, N-dodecylhexadecaneamide, N-octadecylpropioamide, N,N-dimethyldodecaneamide and N,N-dihexylacetoamide, amine compounds such as diethylamine, diheptylamine, dibutylhexadecylamine, N,N,N',N'-tetramethylmethaneamine, triethylamine, tributylamine and trioctylamine; amines having hydroxy such as monoethanolamine, diethanolamine, triethanolamine, N,N,N',N'-tetra(hydroxyethyl)-1,2-diaminoethane, N,N,N'-tri(hydroxyethyl)-1,2-diaminoethane, N,N,N',N'-tetra(hydroxyethylpolyoxyethylene)-1,2-diaminoethane, 1,4-bis(2-hydroxyethyl)piperazine and 1-(2-hydroxyethyl)piperazine; nipecotamide; isonipecotamide; and nicotinamide.

The dispersant of the formula (I) is preferably employed in combination with an amine compound having the following formula (V) or (VI).

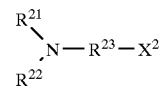

(V)

In the formula (V), $R^{21}$ and $R^{22}$ represent each independently a hydrogen atom, an alkyl group, an alkyl group having a substituent, an aralkyl group or an aralkyl group having a substituent, or $R^{21}$ and $R^{22}$ are bonded to each other to form a 5- or 6-membered saturated ring together with a nitrogen atom. The ring may have at least one of an oxygen atom, a sulfur atom and a nitrogen atom. $R^{23}$ represents an alkylene group or an alkylene group having an ether bond. $X^2$ represents —CON($Y^{21}$) ($Y^{22}$), —OCON($Y^{21}$) ($Y^{22}$), —N($Y^{23}$)CO($Y^{24}$) or —N($Y^{23}$)CON($Y^{21}$) ($Y^{22}$) in which $Y^{21}$, $Y^{22}$, $Y^{23}$ and $Y^{24}$ represent a hydrogen atom, an alkyl group, an alkyl group having a substituent, an aralkyl group or an aralkyl group having a substituent.

$$R^{21}\!\!\diagdown\!\!N\!\!-\!\!R^{24}\!\!-\!\!Z\!\!-\!\!R^{25}\!\!-\!\!N\!\!\diagup\!\!R^{26}$$
$$R^{22}\qquad\qquad\qquad\qquad R^{27}$$

(VI)

In the formula (VI), $R^{21}$, $R^{22}$, $R^{26}$ and $R^{27}$ represent each independently a hydrogen atom, an alkyl group, an alkyl group having a substituent, an aralkyl group or an aralkyl group having a substituent, or $R^{21}$ and $R^{22}$ or $R^{26}$ and $R^{27}$ are bonded to each other to form a 5- or 6-membered saturated ring together with a nitrogen atom. The ring may have at least one of an oxygen atom, a sulfur atom and a nitrogen atom. $R^{24}$ and $R^{25}$ represent an alkylene group or an alkylene group having an ether bond. Z represents —CON($Y^{21}$)—, —OCON($Y^{21}$)— or —N($Y^{22}$)CON($Y^{23}$) in which $Y^{21}$, $Y^{22}$ and $Y^{23}$ represent the same meanings as in the formula (V).

Examples of the compounds of the formulae include bis(2-(1-morphorino)ethyl)terephthalamide.

The pigment-dispersed composition preferably contains a surface active agent for the purpose of improvement of dispersing stability. Examples of the surface active agents include anionic surface active agents such as salt of alkylnaphthalenesulfonic acid and salt of phosphoric acid ester; cationic surface active agents such as ammonium salt; and amphoteric surface active agents such as aminocarboxylic acid and betaine compounds.

The pigment-dispersed composition contains the dispersant in the range of 0.1 to 200 weight parts based on 100 weight parts of the pigment, preferably 1 to 50 weight parts.

The pigment-dispersed composition contains the organic solvent in the range of 10 to 1,000 weight parts based on 100 weight parts of the pigment, especially 20 to 500 weight parts.

The pigment-dispersed composition preferably contains the dispersant in the range of 5 to 80 weight % therein, especially 10 to 70 weight %.

The pigment-dispersed composition generally contains an organic pigment as pigment.

Examples of the organic pigments include:

yellow pigments such as C.I. Pigment Yellow 20, C.I. Pigment Yellow 24, C.I. Pigment Yellow 83, C.I. Pigment Yellow 86, C.I. Pigment Yellow 93, C.I. Pigment Yellow 109, C.I. Pigment Yellow 110, C.I. Pigment Yellow 117, C.I. Pigment Yellow 125, C.I. Pigment Yellow 137, C.I. Pigment Yellow 138, C.I. Pigment Yellow 139, C.I. Pigment Yellow 185, C.I. Pigment Yellow 147, C.I. Pigment Yellow 148, C.I. Pigment Yellow 153, C.I. Pigment Yellow, C.I. Pigment Yellow 154, C.I. Pigment Yellow 166 and C.I. Pigment Yellow 168;

orange pigments such as C.I. Pigment Orange 36, C.I. Pigment Orange 43, C.I. Pigment Orange 51, C.I. Pigment Orange 55, C.I. Pigment Orange 59 and C.I. Pigment Orange 61;

red pigments such as C.I. Pigment Red 9, C.I. Pigment Red 97, C.I. Pigment Red 122, C.I. Pigment Red 123, C.I. Pigment Red 149, C.I. Pigment Red 168, C.I. Pigment Red 177, C.I. Pigment Red 180, C.I. Pigment Red 192, C.I. Pigment Red 215, C.I. Pigment Red 216, C.I. Pigment Red 217, C.I. Pigment Red 220, C.I. Pigment Red 223, C.I. Pigment Red 224, C.I. Pigment Red 226, C.I. Pigment Red 227, C.I. Pigment Red 228, C.I. Pigment Red 240 and C.I. Pigment Red 48:1;

violet pigments such as C.I. Pigment Violet 19, C.I. Pigment Violet 23, C.I. Pigment Violet 29, C.I. Pigment Violet 30, C.I. Pigment Violet 37, C.I. Pigment Violet 40 and C.I. Pigment Violet 50;

blue pigments such as C.I. Pigment Blue 15, C.I. Pigment Blue 15:6, C.I. Pigment Blue 22, C.I. Pigment Blue 60 and C.I. Pigment Blue 64;

Green pigments such as C.I. Pigment Green 7 and C.I. Pigment Green 36;

brown pigments such as C.I. Pigment Brown 23, C.I. Pigment Brown 25 and C.I. Pigment Brown 26; and black pigments such as C.I. Pigment Black 7.

Of these pigments, preferred are C.I. Pigment Yellow 139, C.I. Pigment Yellow 185 and C.I. Pigment Yellow 83, especially C.I. Pigment Yellow 139.

The pigment-dispersed composition of the invention, for example, can be prepared using the above-mentioned materials as follows:

1) A pigment and a dispersant are mixed, and a vehicle is added to the mixture and then subjected to dispersing treatment.

2) A pigment and a dispersant each are added to a vehicle and subjected to dispersing treatment.

3) A pigment and vehicle, and a dispersant and vehicle are separately subjected to dispersing treatment, and they are mixed.

4) A pigment and vehicle are subjected to dispersing treatment, and a dispersant is added to the dispersion.

The vehicles comprises a binder (polymer) and an organic solvent. In the dispersing treatment, only the organic solvent may be employed instead of the vehicle. By removing the solvent from the pigment-dispersed composition, the composition containing no solvent of the invention can be obtained.

Examples of dispersion mixers employed in the dispersing treatment include a neader, a roll mill, an attritor, a super mill, a desolver, a homomixer, a sand mill Examples of the solvents employed in the pigment-dispersed composition include (poly)alkylene glycol monoalkylene glycols and acetate thereof such as ethylene glycol monomethyl ether, ethylene glycol monoethyl ether, propylene glycol monomethyl ether, propylene glycol monoethyl ether, diethylene glycol monomethyl ether, diethylene glycol monoethyl ether and 1-methoxy-2-propyl acetate; esters such as ethyl acetate, n-propyl acetate, i-propyl acetate, n-butyl acetate and i-butyl acetate; aromatic hydrocarbons such as benzene, toluene and xylene; ketones such as acetone, methyl ethyl ketone, methyl i-butyl ketone and cyclohexanone; and alcohols such as methanol, ethanol, 1-propanol, 2-propanol, butanol, hexanol, cyclohexanol, ethylene glycol, diethylene glycol and glycerol. The solvent is generally employed in the range of 50 to 1000 weight % based on the total solid content (total nonvolatile content).

A process for the preparation of a colored image using the dispersed-pigment composition is, for example, performed by the steps of coating a solution containing the dispersed-pigment composition on a support, drying the coated layer to form a dispersed-pigment composition layer, or transferring the dispersed-pigment composition layer formed on a temporary support (transfer sheet) onto the support; forming a known positive- or negative-type photosensitive resin layer on the composition layer; imagewise exposing photosensitive resin layer and developing the layer; and then removing photosensitive resin layer and the composition layer in the non-image area.

The photosensitive colored resin composition can be obtained by adding a photosensitive resin composition to the dispersed-pigment composition of the invention. The above formation of the colored image can be performed by using the photosensitive colored resin composition without formation of the photosensitive resin layer.

As materials of the photosensitive resin composition, all photosensitive resin compositions described in Japanese Patent Publications No. 3(1991)-282404 are employable. Examples of the photosensitive resin compositions includes compositions of negative-type diazo resin and polymer, photopolymerizable compositions, compositions of an azido compound and polymer, and photosensitive compositions containing cinnamic acid.

The photopolymerizable compositions are preferred of theses compositions. The photopolymerizable composition preferably comprises a polymer, a photopolymerizable monomer having at least two ethylenically unsaturated double bonds and a photopolymerization initiator. The photopolymerizable composition is roughly classified into an aqueous alkaline solution soluble type and an organic solvent soluble type. The aqueous alkaline solution soluble type is preferred in view of environmental pollution and working conditions.

The photosensitive colored resin composition of the invention comprises the pigment-dispersed composition of the invention and the photopolymerizable composition comprising a polymer having acidic group, a photopolymerizable monomer having at least two ethylenically unsaturated double bonds and a photopolymerization initiator. The polymer having acidic group is required to have excellent development characteristics in the case of using alkaline developer and good dispersing property with pigment. The polymer preferably has properties such as good compatibility with the photopolymerizable monomer and the photopolymerization initiator, good solubility in an organic solvent, and suitable strength and softening temperature.

Examples of the polymers include (meth)acrylic acid/(meth)acrylic acid alkyl ester copolymer, styrene/maleic anhydride copolymer and compounds obtained by reaction between styrene/maleic anhydride copolymer and alcohol. Preferred is (meth)acrylic acid/(meth)acrylic acid alkyl ester copolymer. The polymer preferably has a weight average molecular weight in the range of 5,000 to 200,000. The photosensitive colored resin composition preferably contains the polymer in the range of 20 to 80 weight % based on the total solid content.

The photosensitive colored resin composition contains the organic solvent. As the solvents, those employed in the pigment-dispersed composition can be employed. The photosensitive colored resin composition preferably contains the organic solvent in the range of 50 to 2,000 weight % based on the total solid content.

Examples of the photopolymerizable monomer having at least two ethylenically unsaturated double bonds include known (meth)acrylic acid esters, urethane (meth)acrylates, (meth)acrylic acid amides, allyl compounds and vinyl esters described in Japanese Patent Provisional Publication No. 60(1985)-258539. The photosensitive colored resin composition preferably contains the photopolymerizable monomer in the range of 10 to 60 weight % based on the total solid content.

The photosensitive colored resin composition generally contains a photopolymerization initiator comprising at least one compound having molecular extinction coefficient of at least 50 in wavelength region of 300 to 500 nm. Examples of the compounds include aromatic ketone compounds, lophine dimers, benzoin compounds, benzoin ether compounds and polyhalogen compounds described in Japanese Patent Provisional Publications No. 2(1990)-48664, No. 1(1989)-152449 and No. 2(1990)-153353. The photopolymerization initiator may be either alone or as a mixture of two or more kinds of them. Preferred are the combination of 4,4'-bis(diethylamino)benzophenone and 2-(o-chlorophenyl)-4,5-diphenylimidazole dimer, and 4-[p-N,N-di(ethoxycarbonylmethyl)-2,6-di(trichloro)-s-triazine]. The photopolymerization initiator is preferably contained in the photosensitive colored resin composition in the range of 0.2 to 10 weight % based on the total solid content.

The formation of color image using the photosensitive colored resin composition of the invention can be, for example, performed according to the following steps (1) to (3).

(1) the step of mixing the dispersant of the formula (I), the organic pigment, the polymer having an acidic group (i.e., alkali-soluble polymer) and the organic solvent and kneading the mixture to give a pigment dispersion; and adding the photopolymerizable monomer, the photopolymerization initiator and an organic solvent if desired to the mixture (pigment dispersion) to prepare a photosensitive colored resin composition (coating solution);

(2) the step of coating the photosensitive colored resin composition on a support and drying the coated layer or transferring a layer of the photosensitive colored resin composition formed by coating on a temporary support onto a support, to form a photosensitive colored resin composition layer; and (3) the step of imagewise exposing the photosensitive colored resin composition layer to light and developing the exposed layer to form a color image (pattern).

In the case that a color filter employed for a liquid crystal display device is prepared, the steps of (2) and (3) are repeated using the photosensitive colored resin composition having color different each other to form two or more color patterns. The preparation of color filter by transferring can be performed according to the methods described in Japanese Patent Provisional Publications No. 4(1992)-208940, No. 5(1993)-72724, No. 5(1993)-80503 and No. 5(1993)-173320. The transferring of the photosensitive colored resin composition on the temporary support onto the support is preferably carried out using a heat roll laminator under an atmospheric or reduced pressure.

As the support, transparent sheets such as a glass plate and a transparent plastic plate or film are generally employed. In order to improve the bonding strength between the support and photosensitive colored resin composition layer, it is preferred that a saline coupling agent is incorporated into the photosensitive colored resin composition or the support is treated with the agent.

The coating of the photosensitive colored resin composition is generally performed by the use of a coater such as a spinner, a bar coater or curtain coater.

Examples of developing solutions employed in the developing procedure include aqueous solutions of alkali metal hydroxides, alkali metal carbonates, alkali metal bicarbonates, ammonia or tetraalkylammonium hydroxides.

The present invention is further described by the following Examples and Comparison Examples.

SYNTHETIC EXAMPLE 1

[Synthesis of compound (1) previously described]

2-Chloro-4-methoxy-6-[(3-phenyl-7-coumarinyl)amino]-1,3,5-triazine was synthesized according to the method described in Example 2 of Japanese Patent Provisional Publications No. 49(1974)-17423. In tetrahydrofuran, 10 g of the above compound and 3.8 g of N,N-diethylaminopropylamine were placed, and these were reacted under reflux for 3 hours. The resultant reaction mixture was poured into water and filtered to obtain precipitated crystal, whereby 9.2 g of the compound (1) having melting point of 187° C. was obtained.

SYNTHETIC EXAMPLE 2

[Synthesis of compound (2) previously described]

Into 800 g of blocks of ice, a solution of 36.9 g of cyanuric chloride in 320 ml of acetone was added dropwise with stirring to prepare a dispersion. 18.6 g of aniline was added dropwise at temperature of 5° C. or lower into the dispersion. At the same time of the addition of aniline, 210 mL of 5% sodium carbonate aqueous solution was added dropwise at temperature of 5° C. or lower with keeping the same dropping rate as in the addition of aniline to the dispersion, to precipitate crystal, whereby 2,4-dichloro-6-phenylamino-1,3,5-triazine was obtained.

In 250 mL of tetrahydrofuran, 24.1 g of the above compound was dissolved. Into the solution, 19.3 g of 25% sodium methylate methanol solution was slowly added dropwise with cooling it in an ice bath, and reacted for 3 hours. The resultant reaction mixture was poured into water and filtered to obtain precipitated crystal, whereby 2-chloro-4-methoxy-6-phenylamino-1,3,5-triazine was obtained.

In tetrahydrofuran, 10,g of the above compound and 6.0 g of N,N-diethylaminopropylamine were placed, and these were reacted under reflux. The resultant reaction mixture was poured into water and extracted with ethyl acetate, whereby 8.9 g of the oily compound (2) was obtained.

$H^1$ NMR (300 MHz, $CDCl_3$) of obtained compound (2)

1.00–1.10 ppm: 6 H, t
1.65–1.80 ppm: 2 H, m
2.45–2.55 ppm: 6 H, m
3.45–3.55 ppm: 2 H, q
3.85–3.95 ppm: 3 H, w
6.55–6.70 ppm: 1 H, m 7.00–7.10 ppm: 1 H, m
7.20–7.35 ppm: 3 H, m
7.55–7.65 ppm: 2 H, m

SYNTHETIC EXAMPLE 3

[Synthesis of compound (4) previously described]

2-Chloro-4-diethylamino-6-[(3-phenyl-7-coumarinyl) amino]-1,3,5-triazine was synthesized according to the method described in Example 14 of Japanese Patent Provisional Publications No. 48(1973)-37969. In tetrahydrofuran, 10 g of the above compound and 3.4 g of N,N-diethylaminopropylamine were placed, and these were reacted under reflux for 4 hours. The resultant reaction mixture was poured into water and filtered to obtain precipitated crystal, whereby 9.2 g of the compound (4) having melting point of 146° C. was obtained.

SYNTHETIC EXAMPLE 4

[Synthesis of compound (8) previously described]

2,4-Dichloro-6-phenylamino-1,3,5-triazine was obtained in the same manner as in Synthetic Example 2.

In 220 mL of tetrahydrofuran, 10.0 g of the above compound was dissolved. Into the solution, a solution of 12.7 g of aniline and, 13.8 g of triethylamine in 65 mL of tetrahydrofuran was slowly added dropwise with cooling it in an ice bath and reacted for 3 hours. The resultant reaction mixture was poured into water and filtered to obtain precipitated crystal, whereby 2-chloro-4,6-diphenylamino-1,3, 5-triazine was obtained.

In tetrahydrofuran, 10 g of the above compound and 4.8 g of N,N-diethylaminopropylamine were placed, and these were reacted under reflux. The resultant reaction mixture was poured into water and filtered to obtain precipitated crystal, whereby 10.5 g of the oily compound (8) having melting point of 87° C. was obtained.

$H^1$ NMR (300MHz, $CDCl_3$) of obtained compound (8)

1.00–1.10 ppm: 6 H, t
1.70–1.80 ppm: 2 H, m
2.45–2.55 ppm: 6 H, m
3.45–3.55 ppm: 2 H, q
6.20–6.30 ppm: 1 H, m
6.95–7.05 ppm: 4 H, m
7.25–7.35 ppm: 4 H, m
7.55–7.65 ppm: 4 H, m

EXAMPLE 1

| Composition of yellow pigment dispersion | |
|---|---|
| C.I. Pigment yellow 139 | 13.66 g |
| Compound (1) described previously | 1.37 g |
| Methacrylic acid/benzyl methacrylate copolymer (molar ratio of monomers: 28/72, weight average molecular weight: 30,000) | 11.38 g |
| 1-Methoxy-2-propyl acetate | 53.60 g |

Materials of the above composition were mixed and dispersed persed (kneaded) using a dispersion mixer (Motor mill M50, available from Eiger Corporation) for 9 hours to prepare a yellow pigment dispersion (yellow pigment-dispersed composition). The dispersing procedure was carried out by rotating the dispersion mixer at a circumferential speed of 9 m/sec. and as beads of the dispersion mixer, zirconia beads having a diameter of 0.65 mm were used.

EXAMPLE 2

The procedures of Example 1 were repeated using Compound (2) instead of Compound (1) to prepare a yellow pigment dispersion.

EXAMPLE 3

The procedures of Example 1 were repeated using Compound (4) instead of Compound (1) to prepare a yellow pigment dispersion.

EXAMPLE 4

The procedures of Example 1 were repeated using Compound (8) instead of Compound (1) to prepare a yellow pigment dispersion.

EXAMPLE 5

The procedures of Example 1 were repeated using the red pigment dispersion of the following composition instead of the composition of yellow pigment dispersion to prepare a red pigment dispersion.

| Composition of red pigment dispersion | |
|---|---|
| C.I. Pigment Red 177 | 13.66 g |
| C.I. Pigment yellow 139 | 2.78 g |
| Compound (1) described previously | 1.37 g |
| Methacrylic acid/benzyl methacrylate copolymer (molar ratio of monomers: 28/72, weight average molecular weight: 30,000) | 11.38 g |
| 1-Methoxy-2-propyl acetate | 53.60 g |

COMPARISON EXAMPLE 1

The procedures of Example 1 were repeated using no Compound (1) to prepare a yellow pigment dispersion.

[Evaluation of pigment dispersion]

The resultant pigment dispersions were evaluated in the following manner.

(1) Viscosity

The viscosity of the resultant pigment dispersion was measured by E type viscometer (rotating cylinder viscometer). Thereby, the extend of thickening by dispersing was evaluated.

(2) Contrast

The resultant pigment dispersion was coated on a glass plate to form a color layer having a thickness of 6 μm (sample). The sample was placed between two polarizing sheets, and transmittance obtained when polarizing axes were parallel each other and that obtained when polarizing axes were perpendicular to each other were measured. The contrast was determined as a ratio of the former transmittance to the latter transmittance.

The measurement was performed based on the method described in The 7-th Color Optical Conference (Ueki, Ozeki, Fukunaga and Yamanaka, Color Filter for 512 color displayed 10.4 inch TFT-LCD, 1990).

EXAMPLE 6

| Preparation of photosensitive red resin composition for preparing color filter | |
|---|---|
| (Photopolymerizable photosensitive composition) | |
| Methacrylic acid/benzyl methacrylate copolymer (molar ratio of monomers: 28/72, weight average molecular weight: 30,000) | 30.00 g |
| Pentaerythritol tetraacrylate monomer | 7.70 g |
| 4-[p-N,N-di (ethoxycarbomethyl)-2,6-di (chloromethyl)-s-triazine] | 0.30 g |
| Hydroquinonemonomethyl ether | 0.01 g |
| 1-Methdxy-2-propyl acetate | 62.00 g |

A red pigment dispersed liquid (45 g, solid content: 33 weight %) obtained by dispersing a processed red pigment (C.I. Pigment Red 177 dispersed in an acrylic resin, Colortex Red U3BN, available from Sanyo Sikiso Co., Ltd.) in 1-methoxy-2-propyl acetate, and the yellow pigment dispersion (9 g) for color matching prepared in Example 1 were mixed to prepare a photosensitive red composition for preparing a color filter.

EXAMPLE 7

The procedures of Example 6 were repeated using the yellow pigment dispersion of Example 2 instead of the yellow pigment dispersion of Example 1 to prepare a photosensitive red composition for preparing a color filter.

EXAMPLE 8

The procedures of Example 6 were repeated using the yellow pigment dispersion of Example 3 instead of the yellow pigment dispersion of Example 1 to prepare a photosensitive red composition for preparing a color filter.

EXAMPLE 9

The procedures of Example 6 were repeated using the yellow pigment dispersion of Example 4 instead of the yellow pigment dispersion of Example 1 to prepare a photosensitive red composition for preparing a color filter.

EXAMPLE 10

The procedures of Example 6 were repeated using the red pigment dispersion of Example 5 (54 g) instead of the red dispersion of processed red pigment to prepare a photosensitive red composition for preparing a color filter.

COMPARISON EXAMPLE 2

The procedures of Example 6 were repeated using the yellow pigment dispersion of Comparison Example 1 instead of the yellow pigment dispersion of Example 1 to prepare a photosensitive red composition for preparing a color filter.

[Evaluation of photosensitive red resin composition]

The resultant photosensitive red resin compositions were evaluated in the following manner.

(1) Viscosity

The viscosity of the resultant photosensitive red composition was measured in the same manner as above. Thereby the extend of thickening by dispersing was evaluated.

(2) Contrast

The resultant photosensitive red resin composition was coated using a spinner on a glass plate, and dried at a temperature of 100° C. for 2 minutes, to form a photosensitive red resin layer having a thickness of 2 μm. The photosensitive red resin layer was exposed to UV light (super high pressure mercury lamp) in a stream of nitrogen, and developing the exposed layer in a 1% sodium carbonate aqueous solution, to prepare a color filter.

The contrast of the resultant color filter was determined in the same manner above.

Results of evaluation on the pigment dispersions and color filters (red resin layers) obtained in Examples and Comparison Examples are shown in Table 1.

TABLE 1

| | Viscosity | Contrast | |
|---|---|---|---|
| | (cp) | Dispersion | Color Filter |
| Example 1 | 40 | 200 | — |
| Example 2 | 80 | 180 | — |
| Example 3 | 70 | 185 | — |
| Example 4 | 50 | 170 | — |
| Example 5 | 70 | 1700 | — |
| Example 6 | 70 | — | 1850 |
| Example 7 | 70 | — | 1785 |
| Example 8 | 70 | — | 1825 |
| Example 9 | 70 | — | 1750 |
| Example 10 | 70 | — | 1700 |
| Com. Ex. 1 | >1200 | 10 | — |
| Com. Ex. 2 | 70 | — | 150 |

As apparent from Table 1, the pigment dispersion using the dispersant of the invention shows a low viscosity and high contrast, and also the color filter containing the pigment dispersion shows high contrast.

What is claimed is:

1. A composition containing an organic pigment and a compound having the formula (I) in an amount of 0.1 to 200 weight % of the pigment:

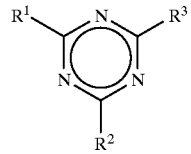

(I)

in which $R^1$ is a group having the formula (II):

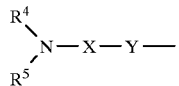

(II)

in which each of $R^4$ and $R^5$ independently represents a hydrogen atom, an alkyl group, a hydroxyalkyl group or an alkoxyalkyl group, or $R^4$ and $R^5$ are bonded to each other to form a ring together with a nitrogen atom, X represents an alkylene group or an alkyleneoxyalkylene group, and Y represents —O— —S— or a group represented by —$NR^6$— wherein $R^6$ is a hydrogen atom or a lower alkyl group; and each of $R^2$ and $R^3$ independently represents a group having the formula (II), an alkyl group, an aralkyl group, an aryl group, an aryl group substituted with alkyl, an alkoxy group, an alkoxy group substituted with alkoxy or aryloxy, an aralkyloxy group, an aryloxy group, an alkylamino group, an alkylamino group substituted with aryl, an arylamino group, an arylamino group substituted with alkyl or aryl, an amino group substituted with heterocyclic group, an amino group substituted with heterocyclic group having alkyl or aryl, or a halogen atom.

2. The composition of claim 1, wherein each of $R^4$ and $R^5$ independently represents a hydrogen atom, an alkyl group of 1 to 5 carbon atoms, a hydroxyalkyl group of 1 to 5 carbon atoms or an alkoxyalkyl group of 2 to 5 carbon atoms, or $R^4$ and $R^5$ are bonded to each other to form a ring together with a nitrogen atom, X represents an alkylene group of 2 to 5 carbon atoms or an alkyleneoxyalkylene group of 2 to 5 carbon atoms, and Y represents —O— or $NR^6$.

3. The composition of claim 1, wherein each of $R^2$ and $R^3$ independently represents an alkoxy group of 1 to 5 carbon atoms, an alkoxy group of 2 to 6 carbon atoms substituted with alkyl, an alkylamino group of 1 to 5 carbon atoms, an alkylamino group of 7 to 11 carbon atoms substituted with aryl, an aralkyloxy group of 6 to 30 carbon atoms, an aryloxy group of 6 to 30 carbon atoms, an arylamino group of 6 to 30 carbon atoms, an amino group of 5 to 30 carbon atoms substituted with heterocyclic group, an amino group of 6 to 30 carbon atoms substituted with heterocyclic group having alkyl or aryl.

4. The composition of claim 1, wherein each of $R^4$ and $R^5$ independently represents a hydrogen atom, an alkyl group of 1 to 4 carbon atoms, an alkyl group of 1 to 4 carbon atoms substituted with hydroxy group or alkoxy at its terminal, or $R^4$ and $R^5$ are bonded to each other, to form a morphorin ring together with a nitrogen atom, X represents an alkylene group of 2 to 5 carbon atoms or an alkyleneoxyalkylene group of 2 to 5 carbon atoms, and Y represents —NH—.

5. The composition of claim 1, wherein $R^2$ represents a group having —$NHR^7$ wherein $R^7$ represents an aryl group of 6 to 10 carbon atoms, an aralkyl group of 7 to 8 carbon atoms or an alkyl group of 1 to 4 carbon atoms, a group having the formula (II) with proviso that each of $R^4$ and $R^5$ independently represents an alkyl group of 1 to 4 carbon atoms, X represents an alkylene group of 2 to 3 carbon atoms and Y represents —NH—, an alkyl group of 1 to 4 carbon atoms, an alarkyl group of 7 to 9 carbon atoms, an alkoxy group of 1 to 8 carbon atoms, an alkoxy group of 2 to 8 carbon atoms substituted with alkoxy or phenoxy, an aryloxy group of 6 to 10 carbon atoms, an aryl group of 6 to 10 carbon atoms or a halogen atom; and $R^3$ represents a group having —$NHR^8$ wherein $R^8$ represents a coumarinyl group, a coumarinyl group substituted with phenyl or methyl, an aryl group of 6 to 12 carbon atoms, an aryl group of 7 to 12 carbon atoms substituted with alkyl, an aralkyl group of 7 to 11 carbon atoms, a quinolinyl group or an alkyl group of 1 to 4 carbon atoms, or an alkoxy group of 1 to 4 carbon atoms.

6. The composition of claim 1, which further contains a polymer having acidic group.

7. The composition of claim 1, wherein the organic pigment comprises a yellow organic pigment.

8. A composition containing an organic pigment, an organic solvent and a compound having the formula (I) in an amount of 0.1 to 200 weight % of the pigment:

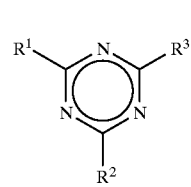

in which $R^1$ is a group having the formula (II):

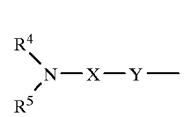

in which each of $R^4$ and $R^5$ independently represents a hydrogen atom, an alkyl group, a hydroxyalkyl group or an alkoxyalkyl group, or $R^4$ and $R^5$ are bonded to each other to form a ring together with a nitrogen atom, X represents an alkylene group or an alkyleneoxyalkylene group, and Y represents —O— —S— or a group represented by —$NR^6$— wherein $R^6$ is a hydrogen atom or a lower alkyl group; and each of $R^2$ and $R^3$ independently represents a group having the formula (II), an alkyl group, an aralkyl group, an aryl group, an aryl group substituted with alkyl, an alkoxy group, an alkoxy group substituted with alkoxy or aryloxy, an aralkyloxy group, an aryloxy group, an alkylamino group, an alkylamino group substituted with aryl, an arylamino group, an arylamino group substituted with alkyl or aryl, an amino group substituted with heterocyclic group, an amino group substituted with heterocyclic group having alkyl or aryl, or a halogen atom.

9. The composition of claim 8, wherein each of $R^4$ and $R^5$ independently represents a hydrogen atom, an alkyl group of 1 to 5 carbon atoms, a hydroxyalkyl group of 1 to 5 carbon atoms or an alkoxyalkyl group of 2 to 5 carbon atoms, or $R^4$ and $R^5$ are bonded to each other to form a ring together with a nitrogen atom, X represents an alkylene group of 2 to 5 carbon atoms or an alkyleneoxyalkylene group of 2 to 5 carbon atoms, and Y represents —O— or $NR^6$.

10. The composition of claim 8, wherein each of $R^2$ and $R^3$ independently represents an alkoxy group of 1 to 5 carbon atoms, an alkoxy group of 2 to 6 carbon atoms substituted with alkyl, an alkylamino group of 1 to 5 carbon atoms, an alkylamino group of 7 to 11 carbon atoms substituted with aryl, an aralkyloxy group of 6 to 30 carbon atoms, an aryloxy group of 6 to 30 carbon atoms, an arylamino group of 6 to 30 carbon atoms, an amino group of 5 to 30 carbon atoms substituted with heterocyclic group, an amino group of 6 to 30 carbon atoms substituted with heterocyclic group having alkyl or aryl.

11. The composition of claim 8, wherein each of $R^4$ and $R^5$ independently represents a hydrogen atom, an alkyl group of 1 to 4 carbon atoms, an alkyl group of 1 to 4 carbon atoms substituted with hydroxy group or alkoxy at its terminal, or $R^4$ and $R^5$ are bonded to each other to form a morphorin ring together with a nitrogen atom, X represents an alkylene group of 2 to 5 carbon atoms or an alkyleneoxyalkylene group of 2 to 5 carbon atoms, and Y represents —NH—.

12. The composition of claim 8, wherein $R^2$ represents a group having —$NHR^7$ wherein $R^7$ represents an aryl group of 6 to 10 carbon atoms, an aralkyl group of 7 to 8 carbon atoms or an alkyl group of 1 to 4 carbon atoms, a group having the formula (II) with proviso that each of $R^4$ and $R^5$ independently represents an alkyl group of 1 to 4 carbon atoms, X represents an alkylene group of 2 to 3 carbon atoms and Y represents —NH—, an alkyl group of 1 to 4 carbon atoms, an alarkyl group of 7 to 9 carbon atoms, an alkoxy group of 1 to 8 carbon atoms, an alkoxy group of 2 to 8 carbon atoms substituted with alkoxy or phenoxy, an aryloxy group of 6 to 10 carbon atoms, an aryl group of 6 to 10 carbon atoms or a halogen atom; and $R^3$ represents a group having —$NHR^8$ wherein $R^8$ represents a coumarinyl group, a coumarinyl group substituted with phenyl or methyl, an aryl group of 6 to 12 carbon atoms, an aryl group of 7 to 12 carbon atoms substituted with alkyl, an aralkyl group of 7 to 11 carbon atoms, a quinolinyl group or an alkyl group of 1 to 4 carbon atoms, or an alkoxy group of 1 to 4 carbon atoms.

13. The composition of claim 8, which further contains a polymer having acidic group.

14. The composition of claim 8, wherein the organic pigment comprises a yellow organic pigment.

15. A photosensitive colored resin composition comprising the pigment-dispersed composition of claim 1 or 8, a polymer having acidic group, a photopolymerizable monomer having at least two ethylenically unsaturated double bonds and a photopolymerization initiator.

16. A triazine compound having the formula (III):

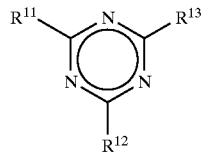

(III)

in which $R^{11}$ represents a group having the formula (IV):

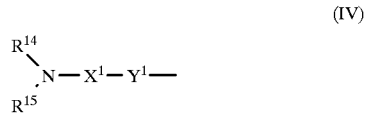

(IV)

wherein each of $R^{14}$ and $R^{15}$ independently represents a hydrogen atom, an alkyl group of 1 to 4 carbon atoms, an alkyl group of 1 to 4 carbon atoms substituted with hydroxy group or alkoxy at its terminal, or $R^{14}$ and $R^{15}$ are bonded to each other to form a morphorin ring together with a nitrogen atom, $X^1$ represents an alkylene group of 2 to 5 carbon atoms or an alkyleneoxyalkylene group of 2 to 5 carbon atoms, and $Y^1$ represents —NH—;

$R^{12}$ represents a group having —$NHR^{17}$ wherein $R^{17}$ represents an aryl group of 6 to 10 carbon atoms, an aralkyl group of 7 to 8 carbon atoms or an alkyl group of 1 to 4 carbon atoms, a group of the formula (IV) with proviso that $R^{14}$ and $R^{15}$ represent each independently an alkyl group of 1 to 5-carbon atoms, $X^1$ represents an alkylene group of 2 to 3 carbon atoms and $Y^1$ represents —NH—, an alkyl group of 1 to 4 carbon atoms, an alarkyl group of 7 to 9 carbon atoms, an alkoxy group of 1 to 8 carbon atoms, an alkoxy group of 2 to 8 carbon atoms substituted with alkoxy or phenoxy, an aryloxy group of 6 to 10 carbon atoms, an aryl group of 6 to 10 carbon atoms or a halogen atom; and $R^{13}$ represents a group having —$NHR^{18}$ wherein $R^{18}$ represents an aryl group of 6 to 12 carbon atoms, an aryl group of 7 to 12 carbon atoms substituted with alkyl, an aralkyl group of 7 to 11 carbon atoms, a quinolinyl group or an alkyl group of 1 to 4 carbon atoms, or an alkoxy group of 1 to 4 carbon atoms.

* * * * *